No. 650,264. Patented May 22, 1900.
W. F. MOSS.
WHEEL.
(Application filed Sept. 7, 1899.)
(No Model.)

WITNESSES:
J. A. Brophy
H. L. Reynolds

INVENTOR
W. F. Moss
BY Munn & Co.
ATTORNEYS

United States Patent Office.

WILLIAM F. MOSS, OF FITZPATRICK, ALABAMA.

WHEEL.

SPECIFICATION forming part of Letters Patent No. 650,264, dated May 22, 1900.

Application filed September 7, 1899. Serial No. 729,735. (No model.)

*To all whom it may concern:*

Be it known that I, WILLIAM F. MOSS, of Fitzpatrick, in the county of Bullock and State of Alabama, have invented a new and Improved Wheel, of which the following is a full, clear, and exact description.

My invention relates to an improvement in wheels capable of use for various purposes, but more particularly designed for use as pulleys for communicating power.

My invention comprises the novel features hereinafter described and claimed.

Reference is to be had to the accompanying drawings, forming a part of this specification, in which similar characters of reference indicate corresponding parts in both views.

Figure 1:
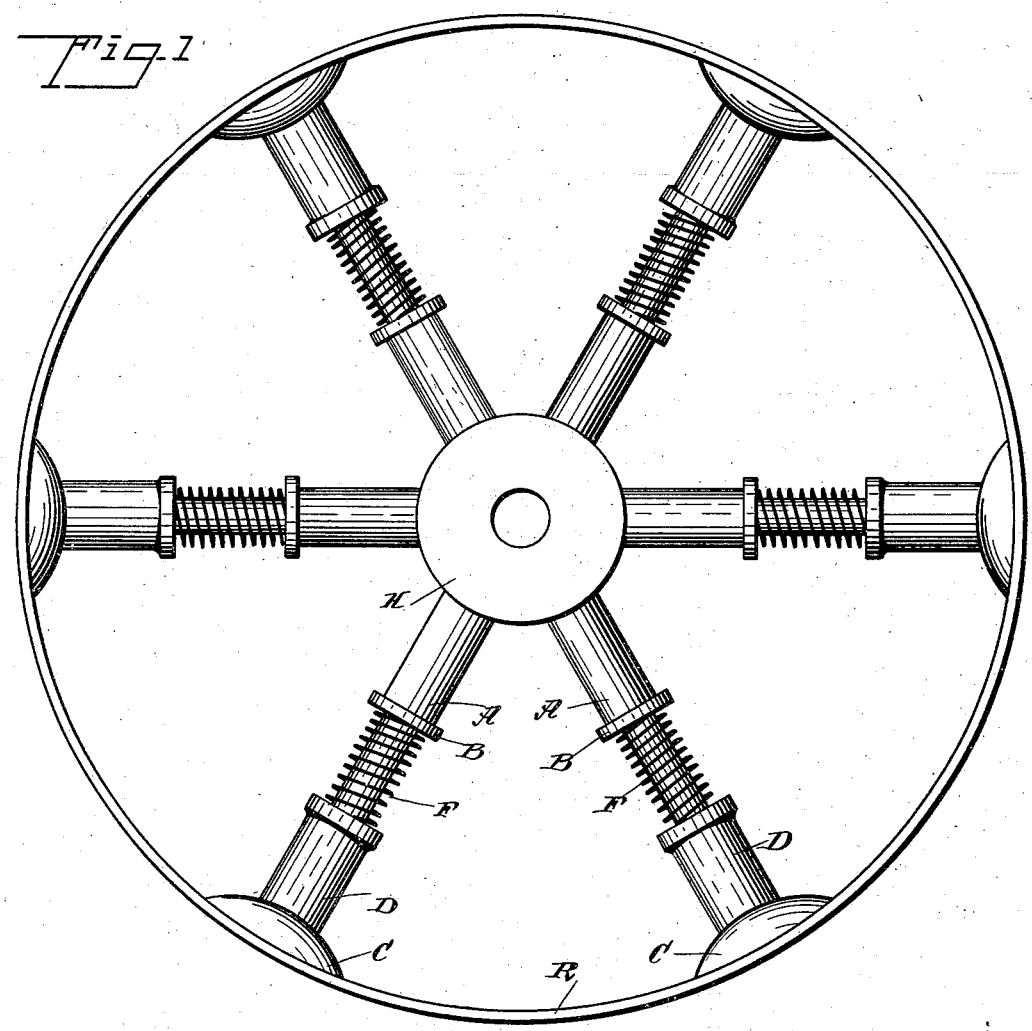
Figure 2:
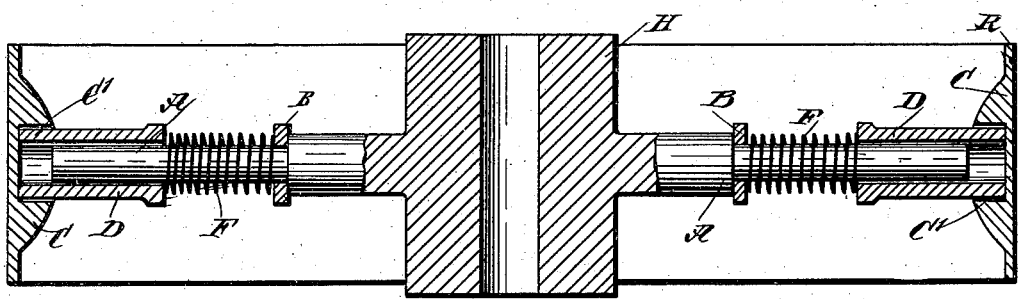

Figure 1 is a side view of my invention, and Fig. 2 is a diametrical section of the same.

The object of my invention is to produce a wheel or pulley which will have a certain amount of resiliency or compressibility, so that certain results may be secured by the use thereof in special places. One purpose for which this wheel or pulley is designed is for use as a friction or belt pulley in communicating power upon various machines where a rigid pulley has not been found to work satisfactorily—as, for instance, in places where the variation in the amount of power required is liable to fluctuate between wide limits.

This wheel is composed of two principal parts, the central portion consisting of the hub and spokes connected therewith and the other portion consisting of the rim, which is spring-supported upon the spokes. The central portion of the wheel may be of any usual form of construction, but is preferably made with a central hub H and spokes A, fixedly secured to said hub. These spokes ordinarily are cast solid with the hub when the wheel is made of iron. The spokes A are not of sufficient length to reach the rim, but stop a little short thereof, the length of the spokes being such as to allow them to pass inside of bosses C, which are secured to the inner side of the rim R, which is constructed of flexible material. These bosses are provided with sockets C', opening inward and adapted to receive the outer ends of sleeves D, said sleeves being of such size as to loosely fit about the spokes A, as shown in Fig. 2, and to slide thereon and also to fit snugly within the sockets C' of the bosses C.

The spokes A have each a shoulder B, adapted to support the inner end of a spiral spring F, which surrounds the central portion of the spoke and bears against the inner end of the sleeve D. It will thus be seen that the rim is supported from the central portion of the wheel by means of the springs F, the sleeves D forming simply guiding members to hold the two parts in proper relative position. The weight is therefore carried at all times upon the springs F.

When it is desired to remove the central portion of the wheel from the rim, this may be done by forcing the sleeves D inward a sufficient amount to withdraw them from the sockets C'.

It will be seen that the spokes are not rigidly secured to the rim R, but that the rim is supported upon the springs F, so that when an unusual pressure is brought to bear upon the rim at any point it may yield slightly. This feature will be of considerable advantage in many places—as, for instance, where the power varies widely and the belt is liable to be thrown off of the pulleys of the usual construction. If the pulley were constructed according to my invention, the belt would cause the pulley to yield slightly and would not be thrown off. My wheel will also be found to have material advantages for use as a friction-pulley. With this arrangement, in operation the flexible rim R permits the sleeve D to assume such positions as will enable the spokes to run true in the sleeves at all times during the operation of the wheel. Also the looseness of connection between the parts D and A will permit these parts to accommodate themselves to any unevenness of action that otherwise would interfere with the easy operation of the apparatus.

Having thus fully described my invention, I claim as new and desire to secure by Letters Patent—

1. A pulley having a rim provided with sockets on its inner side, spokes corresponding in position with the sockets, the spokes terminating short of the sockets, sleeves surrounding the outer ends of the spokes and fitting the sockets in the rim, and springs supported from the spokes and forcing said sleeves outward, substantially as described.

2. A pulley having a rim provided with sockets on its inner side, spokes corresponding in position with the sockets, the spokes terminating short of the sockets, sleeves surrounding the outer ends of the spokes and fitting the sockets in the rim, and spiral springs surrounding the spokes and bearing against the inner ends of the sleeves to force them outward, the spokes having shoulders engaging the inner ends of the springs, substantially as specified.

WILLIAM F. MOSS.

Witnesses:
W. W. EIDSON,
W. J. HAND.